US009868349B2

(12) United States Patent
Pritchard et al.

(10) Patent No.: US 9,868,349 B2
(45) Date of Patent: Jan. 16, 2018

(54) E-ASSIST WITH TORQUE VECTORING

(71) Applicant: BorgWarner Inc., Auburn Hills, MI (US)

(72) Inventors: Larry A. Pritchard, Macomb, MI (US); Thaddeus Kopp, Oakland Township, MI (US); Keith Feldt, Waterford, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/824,675

(22) Filed: Aug. 12, 2015

(65) Prior Publication Data

US 2016/0207396 A1 Jul. 21, 2016

Related U.S. Application Data

(60) Provisional application No. 62/104,926, filed on Jan. 19, 2015, provisional application No. 62/104,943, filed on Jan. 19, 2015.

(51) Int. Cl.
B60W 10/02 (2006.01)
B60K 17/02 (2006.01)
F16H 3/44 (2006.01)
B60K 1/00 (2006.01)
B60K 17/08 (2006.01)
B60K 17/16 (2006.01)
(Continued)

(52) U.S. Cl.
CPC ............... B60K 17/02 (2013.01); B60K 1/00 (2013.01); B60K 17/08 (2013.01); F16H 3/44 (2013.01); B60K 17/16 (2013.01); B60K 2001/001 (2013.01); F16H 3/54 (2013.01); F16H 48/22 (2013.01); F16H 2200/0021 (2013.01); F16H 2200/0034 (2013.01); F16H 2200/2007 (2013.01); F16H 2200/2035 (2013.01); F16H 2200/2064 (2013.01)

(58) Field of Classification Search
CPC .. B60K 17/02; B60K 17/08; B60K 2001/001; B60K 17/16; F16H 3/44; F16H 2200/2007; F16H 3/54; F16H 48/22; F16H 2200/0021; F16H 2200/0034; F16H 2200/2064

See application file for complete search history.

(56) References Cited

U.S. PATENT DOCUMENTS 5,845,732 A * 12/1998 Taniguchi ................ B60K 1/00
 180/65.6
5,961,413 A * 10/1999 Martin .................... B60K 17/02
 475/83

(Continued)

Primary Examiner — David J Hlavka
(74) Attorney, Agent, or Firm — BrooksGroup

(57) ABSTRACT

A product may comprise an electric machine, and may include first and second shafts connectable to the electric machine in torque a transferring relationship. A first clutch assembly may selectively connect the electric machine with the first shaft and a second clutch assembly may selectively connect the electric machine with the second shaft. A gear set may be operatively engageable between the electric machine and the first and second clutch assemblies. An engagement coupling may connect the gear set in a high range between the electric machine and the first and second clutch assemblies, and the engagement coupling may connect the gear set in a low range between electric machine and the first and second clutch assemblies.

19 Claims, 5 Drawing Sheets

(51) Int. Cl.
*F16H 3/54* (2006.01)
*F16H 48/22* (2006.01)

(56) References Cited

U.S. PATENT DOCUMENTS

| | | | | |
|---|---|---|---|---|
| 8,499,868 B2* | 8/2013 | Fuechtner | ................ | B60K 1/00 180/65.7 |
| 2004/0266576 A1* | 12/2004 | Hvolka | .................... | B60K 6/36 475/116 |
| 2006/0046887 A1* | 3/2006 | Bennett | ................ | B60K 17/043 475/150 |
| 2007/0287575 A1* | 12/2007 | Hvolka | .................... | F16H 3/54 475/323 |
| 2010/0285914 A1* | 11/2010 | Wenthen | ................ | B60K 17/06 475/150 |
| 2010/0317476 A1* | 12/2010 | Schoenek | ................ | B60K 6/26 475/5 |
| 2012/0221197 A1* | 8/2012 | Hisada | ................ | B60H 1/3222 701/36 |
| 2014/0106921 A1* | 4/2014 | Mack | ...................... | B60K 1/00 475/150 |
| 2015/0011347 A1* | 1/2015 | Takahashi | ................ | B60K 1/00 475/151 |

\* cited by examiner

E-ASSIST WITH TORQUE VECTORING

CROSS-REFERENCE TO RELATED APPLICATIONS

This application claims the benefit of both U.S. Provisional Application No. 62/104,926, filed Jan. 19, 2015, and U.S. Provisional Application No. 62/104,943 filed Jan. 19, 2015.

TECHNICAL FIELD

The field to which the disclosure generally relates includes automotive powertrain systems and, more particularly, includes electric drive units for powertrain systems.

BACKGROUND

Conventional automotive vehicles known in the art may include a powertrain system in rotational communication with one or more drivelines.

SUMMARY OF ILLUSTRATIVE VARIATIONS

A number of illustrative variations may include a product that may comprise an electric machine, and may include first and second shafts connectable to the electric machine in a torque transferring relationship. A first clutch assembly may selectively connect the electric machine with the first shaft and a second clutch assembly may selectively connect the electric machine with the second shaft. A gear set may be operatively engageable between the electric machine and the first and second clutch assemblies. An engagement coupling may connect the gear set in a high range between the electric machine and the first and second clutch assemblies, and the engagement coupling may connect the gear set in a low range between electric machine and the first and second clutch assemblies.

In a number of additional illustrative variations an electric drive unit may comprise an electric machine that may act to generate a rotational torque. A first shaft may be responsive to the rotational torque, and a second shaft may also be responsive to the rotational torque. A clutch housing may be in rotational communication with the electric machine. A first clutch assembly may include a first set of clutch discs rotatably fixed to the clutch housing. A second clutch assembly may include a second set of clutch discs rotatably fixed to the clutch housing. A first set of clutch plates may be provided in the first clutch assembly and may be rotatably fixed to the first shaft and may be interleaved with the first set of clutch discs. A second set of clutch plates may be provided in the second clutch assembly and may be rotatably fixed to the second shaft and may be interleaved with the second set of clutch discs. A gear set may be engageable between the electric machine and each of the first and second clutch assemblies. The gear set may effect a low range, a high range and a neutral operating state between the electric machine and each of the first and second clutch assemblies.

A number of other illustrative variations may include an electric drive unit for use in a powertrain system and may include first and second drivelines, and a primary propulsion system translating rotational torque only to the first driveline. The second driveline may include first and second road wheels. The electric drive unit may comprising an electric machine that may generate a rotational torque. A clutch housing may be in rotational communication with the electric machine. A first shaft may be rotatably fixed with the first road wheel. A second shaft may be rotatably fixed with the second wheel. A first clutch assembly may selectively couple the clutch housing with the first shaft such that the rotational torque may be selectively and independently modulated through the first clutch assembly to the first road wheel. A second clutch assembly may selectively couple the clutch housing with the second shaft such that the rotational torque may be selectively and independently modulated through the second clutch assembly to the second road wheel.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
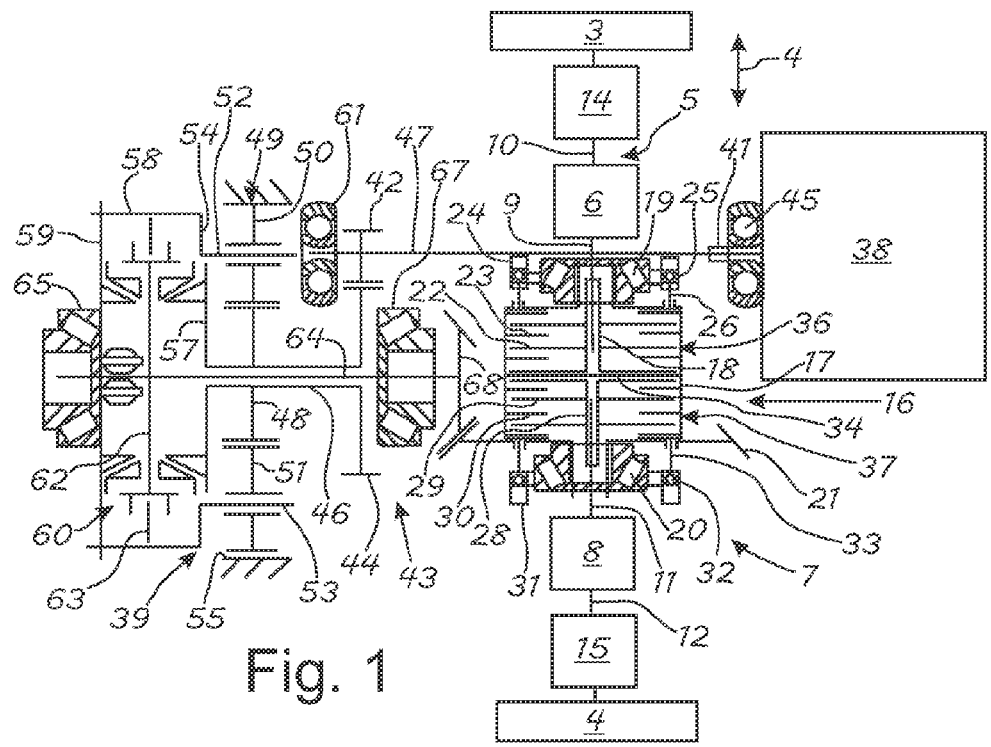
FIG. 1 is a schematic illustration of a product showing part of a vehicle powertrain according to a number of variations.

In a number of variations as illustrated in FIG. 1, a product 7 may include road wheels 3 and 4 which may be connected to an axle assembly 5. The axle assembly 5 may include inner joints 6 and 8, which may be constant velocity joints that may transfer rotation and may allow for angular variation between the connected components. The joint 6 may connect an axle shaft 9 with an axle shaft 10. The Joint 8 may connect an axle shaft 11 with an axle shaft 12. The axle shafts 10 and 12 may be connected with outer joints 14 and 15 respectively, which may be constant velocity joints and may be connected to the road wheels 3 and 4, respectively.

In a number of variations the axle assembly 5 may be operatively connected with an electric drive unit 43 that may include a differential unit 16. The axle assembly 5 may extend in an axial direction 4 generally along an axis that is defined coaxial with the axle shafts 9 and 11. The differential unit 16 may include a clutch housing 17 that may be rotatable and may be carried by bearings 19 and 20. A gear 21 may be engaged with, or connected to the clutch housing 17 to rotate therewith. The gear 21 may be a bevel gear and may be a spiral bevel right angle gear.

The axle shaft 9 may be connected to, and may rotate with, a driven shaft 18 that may be positioned in the clutch housing 17 and that may be associated with a clutch assembly 36, which may be a multi-plate clutch pack. It should be appreciated that the driven shaft 18 may operate to provide input from the axle assembly 5 instead of output to the axle assembly 5, such as during regenerative braking with input from the axle shaft 9. A number of inner plates 22 may positioned on the driven shaft 18. The inner plates 22 may be fixed to rotate with the driven shaft 18, and may be configured to slide in the axial direction 4 on the driven shaft 18 through a provision such as keys on one of the driven shaft 18 and the inner plates 22, and interconnecting slots on the other. A number of clutch discs 23 may be interleaved with the inner plates 22 and may be fixed to rotate with the clutch housing 17. The clutch discs 23 may be configured to slide in the axial direction 4 through a provision such as keys on one of the clutch housing 17 and clutch discs 23 and interconnecting slots on the other. An actuator 24 or a number of actuators may be provided to operate the clutch assembly 36 and may be engaged therewith through bearings 25 and a rotating link 26 that may engage the most outboard located of the clutch discs 23. The actuator 24 may be operated by electrical, mechanical, fluid, or another power source or combination thereof. The actuator 24 may be fixed, and through the bearings 25, the link 26 may be rotatable with the clutch discs 23 and the clutch housing 17. In a number of variations the link 26 may be a ring shaped element that may transfer force between the actuator 24 and the clutch discs 23. It should be appreciated that instead of operating on the clutch discs 23, the actuator 24 may be configured to operate on the inner plates 22.

The axle shaft 11 may be connected to, and may rotate with, a driven shaft 28 that may be positioned in the clutch housing 17 and may be associated with a clutch assembly 37, which may be a multi-plate clutch pack. It should be appreciated that the driven shaft 28 may operate to provide input from the axle assembly 5 instead of output to the axle assembly 5 such as during regenerative braking with input from the axle shaft 11. A number of inner plates 29 may positioned on the driven shaft 28. The inner plates 29 may be fixed to rotate with the driven shaft 28, and may be configured to slide in the axial direction 4 on the driven shaft 28 through a provision such as keys on one of the driven shaft 28 and the inner plates 29, and interconnecting slots on the other. A number of clutch discs 30 may be interleaved with the inner plates 29 and may be fixed to rotate with the clutch housing 17. The clutch discs 30 may be configured to slide in the axial direction 4 through a provision such as keys on one of the clutch housing 17 and clutch discs 30 and interconnecting slots on the other. An actuator 31 or number of actuators, may be provided to operate the clutch assembly 37 and may be engaged therewith through bearings 32 and a rotating link 33 that may engage the most outboard located of the clutch discs 30. The actuator 31 may be operated by electrical, mechanical, fluid, or another power source or combination thereof. The actuator 31 may be fixed, and through the bearings 32, the link 33 may be rotatable with the clutch discs 30 and the clutch housing 17. In a number of variations the link 33 may be a ring shaped element that transfers force between the actuator 31 and the clutch discs 30. It should be appreciated that instead of operating on the clutch discs 30, the actuator 31 may be configured to operate on the inner plates 29.

A bulkhead type separator 34 may be fixed to the clutch housing 17 and may be positioned between the clutch assemblies 36 and 37. The separator 34 may act as a reaction element for both clutch assemblies 36 and 37 and may extend completely across the clutch housing 17 perpendicular to the axial direction 4. The actuator 24 may selectively apply force to the clutch discs 23 and the inner plates 22 forcing the clutch assembly 36 against the separator 34. Friction material surfaces may be provided between the inner plates 22 and the clutch discs 23, and compression by the actuator 24 may transfer rotation between the clutch housing 17 and the driven shaft 18. The amount of torque transferred may be independently varied by controlling the pressure applied by the actuator 24. The actuator 31 may selectively apply force to the clutch discs 30 and the inner plates 29 forcing the clutch assembly 37 against the separator 34. Friction material surfaces may be provided between the inner plates 29 and the clutch discs 30, and compression by the actuator 31 may transfer rotation between the clutch housing 17 and the driven shaft 28. The amount of torque transferred may be independently varied by controlling the pressure applied by the actuator 31. Rotation of the gear 21 may cause the clutch housing 17 to rotate and through the clutch assemblies 36 and 37 may cause the axle shafts 9 and 11 to rotate driving the road wheels 3, 4. The force applied by the actuators 24 and 31 may be equal or may be selectively and independently applied in a non-uniform manner to transfer different torque levels to the axle shafts 9 and 11, and the connected road wheel 3 and 4. This independent control may be used to freely distribute drive torque between the road wheels for torque vectoring to enhance vehicle mobility and vehicle dynamics.

In a number of variations an electric machine 38 may be provided in the electric drive unit 43 and may be connected with the axle assembly 5 through a power transfer unit 39. The electric machine 38 may be a motor or may be a motor-generator, or may be another type of electric machine to provide power to the power transfer unit 39 and to provide charging. A shaft 41, which may be a rotor shaft may extend from the electric machine 38 and may be supported by bearings 45. The shaft 41 may be engaged with the proximal end of a shaft 47, or may itself, extend past the axle assembly 5 (without connecting directly therewith), and may have a distal end supported for rotation by bearings 61. A gear 42, which may be a helical gear may be fixed on the shaft 41 or 47 to rotate therewith and may be disposed in the power transfer unit 39.

In a number of variations the gear 42 may mesh with, and may be positively engaged to rotate with, a gear 44. The gear 44 may be a helical gear and may have a larger diameter than the gear 42 to provide a reduction there between from the shaft 41 or 47. The gear 44 may be connected with a torque transfer element 46 that may be tubular in shape and may mesh with, and may be positively engaged to rotate with a gear 48. The gear 48 may be a sun gear in a gear set 49, which may be a planetary gear set. The gear 48 may mesh with, and may be positively engaged to rotate with gears 50 and 51. The gears 50, 51 may be planet gears and another number may be provided. The gears 50, 51 may rotate on pins 52 and 53, respectively, which may be fixed to a carrier 54. The gears 50, 51 may mesh with and may be positively engaged to rotate within a gear 55 which may be a ring or annulus gear and may include internal teeth. The gear 55 may be held or grounded so that it may be fixed from rotation. Rotation of the gear 48 may cause the gears 50, 51 to rotate and to walk around the inside of the gear 55 which may cause the carrier 54 to rotate. The torque transfer element 46 may be connected to or formed with, or the gear 48 and may be connected to or formed with, a torque transfer element 57, and may rotate therewith. The carrier 54 may be connected to or formed with a torque transfer element 58 and may rotate therewith. The torque transfer element 58 may be connected with another torque transfer element 59 that may be rotatably supported.

In a number of variations an engagement coupling 60 may include an engagement element 62 that may be fixed to rotate with a shaft 64. The shaft 64 may be supported for rotation by bearings 65, 67 and may extend through the torque transfer element 46. A gear 68 may be fixed with the shaft 64 to rotate therewith and may mesh with and may be positively engaged to rotate with the gear 21 to drive, or be driven by, the axle assembly 5. The gear 68 may be a bevel gear and may be a spiral bevel right angle gear. The engagement element 62 may selectively disconnect the driven gear set 49 from the shaft 64. The engagement element 62 may be selectively shifted to the right as viewed in FIG. 1 by a shift fork 63 to engage the torque transfer element 57. This may selectively connect the gear set 49 with the shaft 64 through the engagement element 62 with output from the gear 48 and its connected torque transfer element 57. The engagement element 62 may be selectively shifted to the left as viewed in FIG. 1 by the shift fork 63 to engage the torque transfer element 59. This may selectively connect the gear set 49 with the shaft 64 through the engagement element 62 with output from the carrier 54 and its connected torque transfer elements 58, 59. When input may be provided from the gear 48 to the shaft 64, rotational speed from the torque transfer element 46 may be maintained. When input may be provided from the carrier 54 to the shaft 64, rotational speed from the torque transfer element 46 may be reduced, and torque may be increased.

In a number of variations, operation of the product 7 may involve driving the axle assembly 5 from the electric machine 38. Rotational torque may be transferred from the electric machine 38 to the gear 42 and its engaged gear 44. In a high range mode of operation, the gear 44 may drive the torque transfer element 46, the gear 48 and the torque transfer element 57. The engagement coupling 60 may be a clutch or a synchromesh clutch or a synchronizer or another mechanism configured to selectively transfer torque. The engagement coupling 60 may transfer torque from the torque transfer element 57 to the shaft 64 through the engagement element 62 resulting in rotation of the shaft 64. The shaft 64 may drive the clutch housing 17 through the meshing gears 68 and 21. Rotation to the axle shafts 9 and 11 may be provided by actuation of the clutch assemblies 36 and 37. The axle shafts 9 and 11 may drive the road wheel 3 and 4. When greater torque is desired at the road wheel 3, the clutch assembly 36 may be actuated with greater pressure than the clutch assembly 37. When greater torque is desired at the road wheel 4, the clutch assembly 37 may be actuated with greater pressure than the clutch assembly 36. As a result, torque vectoring between the road wheels 3 and 4 may be provided. Independently varying torque to each road wheel 3, 4 may provide improved vehicle dynamic response or traction such as by delivering greater torque to the road wheel that has the most traction.

Figure 2:
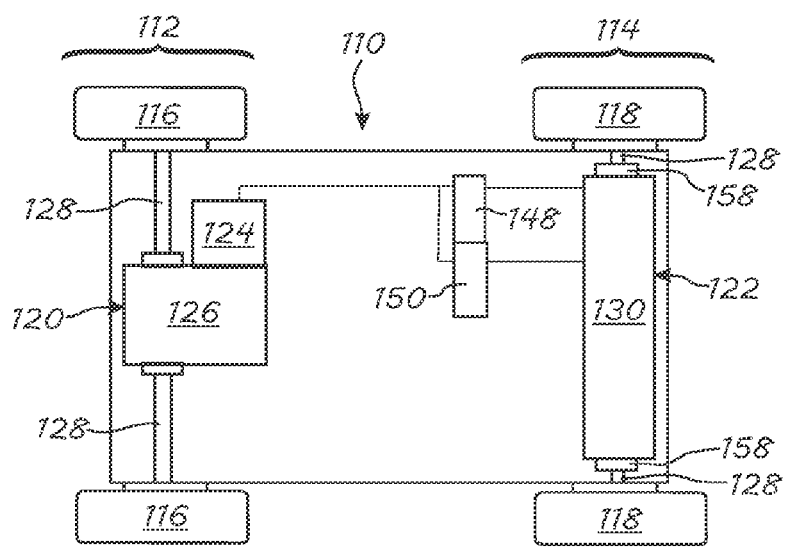
FIG. 2 is a schematic plan view of a vehicle powertrain system including an electric drive unit according to a number of variations.

Referring to FIG. 2 a number of variations may include a vehicle powertrain system as schematically illustrated at 110. The powertrain system 110 may include a first driveline 112 and a second driveline 114. In a number of variations the first driveline 112 may include a first pair of opposing road wheels 116, and the second driveline 114 may include a second pair of opposing road wheels 118. The associated vehicle may include any number of drivelines with any suitable number of wheels in other variations. The powertrain system 110 may include a primary propulsion system 120 and an auxiliary propulsion system 122. The primary propulsion system 120 may act to generate and translate rotational torque only to the first pair of road wheels 116 of the first driveline 112. Similarly, and as described in greater detail below, the auxiliary propulsion system 122 may act to generate and translate rotational torque only to the second pair of road wheels 118 of the second driveline 114.

In a number of variations as illustrated in FIG. 2, the primary propulsion system 120 may be realized by a number of power plant options and as an example may be a convention internal combustion engine 124 that may be in rotational communication with a transmission 126. The engine 124 may generate rotational torque which may be selectively translated to the transmission 126 which, in turn, may translate rotational torque to the first pair of road wheels 116. The transmission 126 may transfer the rotational speed and torque generated by the engine 124 at various gear ratios and may translate rotation to the road wheels 116 to so as to drive the vehicle in operation. The first driveline 112 may include a pair of axle shafts 128 that may employ continuously variable joints and that may translate rotational torque from the transmission 126 to the first pair of road wheels 116. The engine 124 and the transmission 126 of the primary propulsion system 120 may be of the type employed in conventional "transverse front wheel drive" powertrain systems. The engine 124 and/or the transmission 126 may be of any suitable type, configured in any suitable way sufficient to generate and translate rotational torque to the first driveline 112. In a number of variations the primary propulsion system 120 may be configured differently, or even omitted entirely. In a number of variations the primary propulsion system 120 may employ a "hybrid engine," whereby rotational torque translated to the first driveline 112 may be generated by the engine 124 as well as by one or more electric motors (not shown, but generally known in the art).

In a number of variations the powertrain system 110 may include an auxiliary propulsion system 122. As illustrated in FIG. 2, the auxiliary propulsion system 122 may be realized as an electric drive unit, generally indicated at 130. In a number of variations the electric drive unit 130 may be used in connection with any suitable type of vehicle powertrain system, with or without the use of a conventional internal combustion engine 124. In a number of variations both the primary propulsion system 120 and the auxiliary propulsion system 122 may be realized as independent electric drive units 130. Similarly, the primary propulsion system 120 of the powertrain system 110 may be omitted entirely. In a number of variations the electric drive unit 43 of FIG. 1 may be used in place of the electric drive unit 130. In a number of variations the powertrain system 110 may be adapted for use with automotive passenger vehicles or with any suitable type of vehicle, such as heavy-duty trucks, trains, airplanes, ships, construction vehicles or equipment, military vehicles, recreational vehicles, or any other type of vehicle that may benefit from electrically-powered torque generation.

Figure 3:
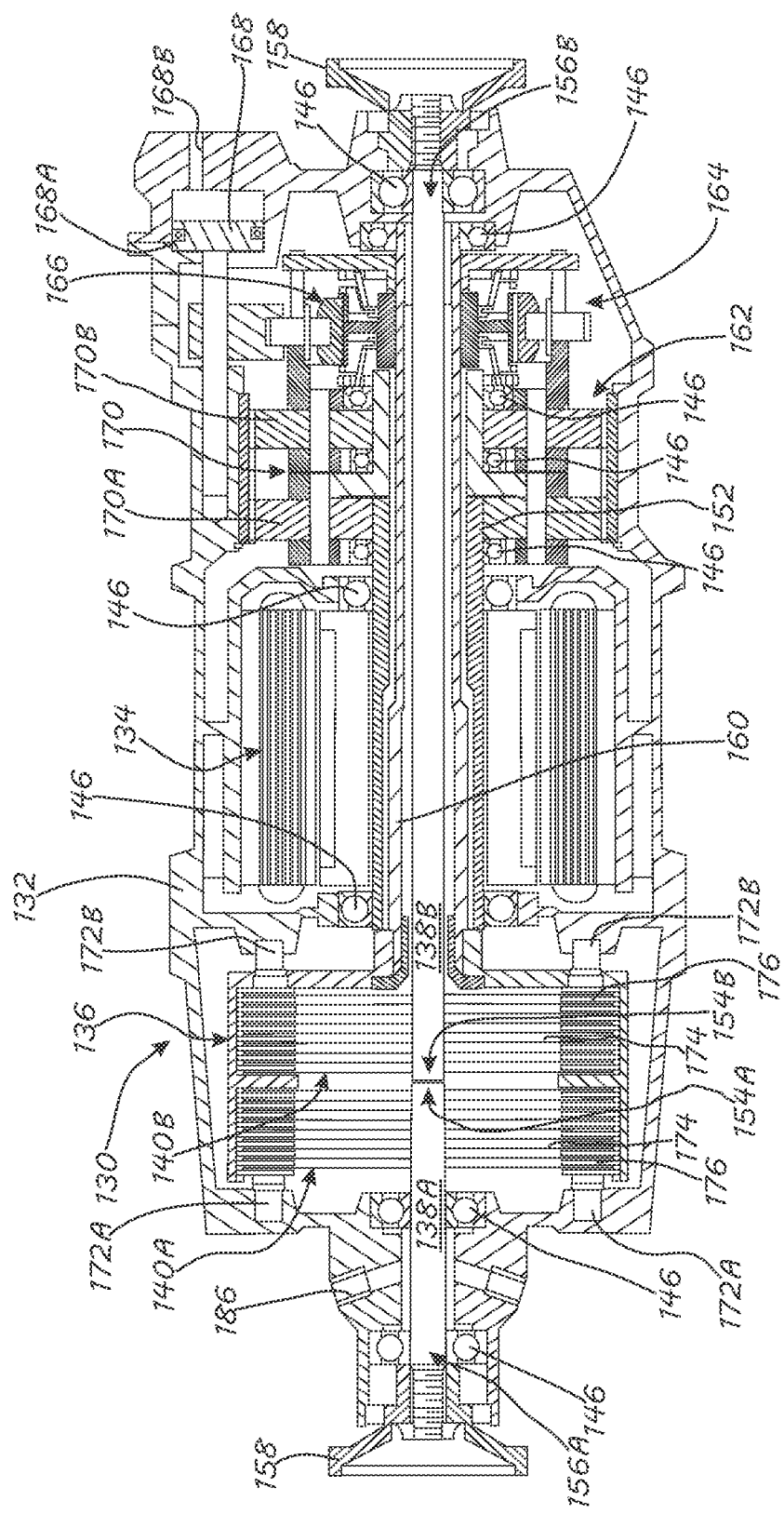
FIG. 3 is a sectional view of the electric drive unit according to a number of variations, shown in a first configuration.

Referring, in addition to FIG. 2, to FIGS. 3-6, where like numerals are used to designate like structure, in a number of variations as shown in FIG. 3, the electric drive unit 130 may include a main housing 132, an electric machine 134, a clutch housing 136, a pair of driven shafts 138A, 138B, a pair of clutch assemblies 140A, 140B, and may include a hydraulic control system 141 (shown in FIGS. 5 and 6), which may include a pump assembly 142 and a pair of control valves 144A, 144B. Each of these components will be described in greater detail below.

The electric machine 134 of the electric drive unit 130 may be supported in the main housing 132, such as by one or more bearings, generically indicated at 146. The electric machine 134 may act to generate rotational torque that may be used to drive the second pair of road wheels 118 of the second driveline 114, as described in greater detail below. In a number of variations the auxiliary propulsion system 122 may, as shown in FIG. 2, include a battery 148 and a controller 150, both of which may be in electrical communication with the electric machine 134. The battery 148 may be used to power the electric machine 134 in operation and may be of any suitable type, size, or configuration. The controller 150, may be an "electronic control module," and may be in electrical communication with, and may drive, the control valves 144A, 144B, the electric machine 134, and the pump assembly 142 (electrical connection not shown in detail, but generally known in the art). In a number of variations the auxiliary propulsion system 122 may be configured so that the electric machine 134 may also function as a generator that may be used to charge the battery 148, such as by regenerative breaking. In a number of variations the battery 148 may be charged while the vehicle is parked, which may use "plug-in hybrid" technology known in the related art.

In a number of variations the electric machine 134 may be of any suitable type or configuration sufficient to generate rotational torque using power from the battery 148. In a number of variations the electric machine 134 may be realized as a DC traction motor or an AC induction motor. In a number of variations the electric machine 134 may have a hollow output shaft 152. As described in greater detail below, the hollow output shaft 152 may cooperate with one or more of the driven shafts 138A, 138B, so as to optimize the overall packaging size of the electric drive unit 130. The hollow output shaft 152 may be axially aligned with at least one of the driven shafts 138A, 138B. In a number of variations the hollow output shaft 152 and/or electric machine 134 may be aligned or otherwise configured differently with respect to the driven shafts 138A, 138B, such as to meet packaging requirements.

In a number of variations the electric drive unit 130 may include the clutch housing 136 and may include the pair of driven shafts 138A, 138B. The clutch housing 136 may be rotatably supported in the main housing 132 and may be in rotational communication with the electric machine 134. In a number of variations the driven shafts 138A, 138B may be axially aligned with each other. In a number of variations the driven shafts 138A, 138B may be aligned differently without departing from the scope of the present invention. The driven shafts 138A, 138B may be rotatably supported in the main housing, such as by one or more bearings 46. Each of the driven shafts 138A, 138B may have an input end 154A, 154B and an output end 156A, 156B. In a number of variations each of the driven shafts 138A, 138B may extend at least partially into the clutch housing 136 so as to facilitate connection of the input ends 154A, 154B with the respective clutch assemblies 140A, 140B, as described in greater detail below. The output ends 156A, 156B may each be in rotational communication with one of the road wheels 118 of the second driveline 114. In a number of variations the electric drive unit 130 may include an output flange 158 that may be operatively attached to each of the output ends 156A, 156B of the driven shafts 138A, 138B. The output flanges 158 may facilitate simple connection to the second pair of road wheels 118, such as by another set of continuously-variable joints 128 (see FIG. 2). In a number of variations the electric drive unit 130 may be designed in any suitable way sufficient to translate rotational torque from the driven shafts 138A, 138B to the second pair of road wheels 118 of the second driveline 114, with or without the use of output flanges 158.

Figure 4:
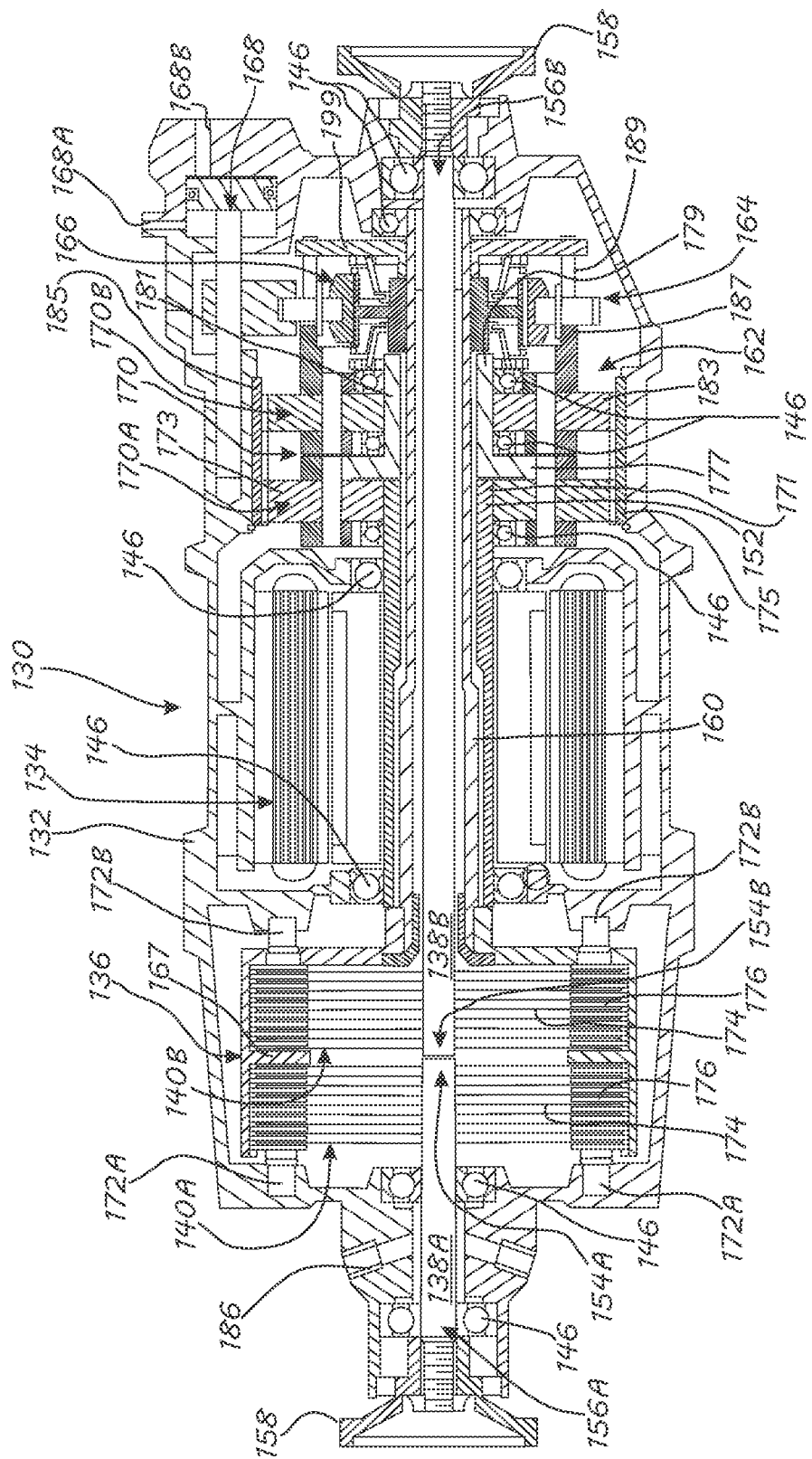
FIG. 4 is a sectional view of the electric drive unit of FIG. 3 shown in a second configuration.

In a number of variations the electric drive unit 130 may include a pair of clutch assemblies 140A, 140B, that may include multi-plate clutch packs and that may be operatively supported in torque translating relationship with the clutch housing 136. The clutch assemblies 140A, 140B may be hydraulically-actuated via pressurized hydraulic fluid generated by the pump assembly 142 of the hydraulic control system 141. The clutch assemblies 140A, 140B may each be selectively coupled to one of the input ends 154A, 154B of the driven shafts 138A, 138B such that rotational torque generated by the electric machine 34 may be selectively and independently modulated through the clutch assemblies 140A, 140B to each of the road wheels 118 of the second driveline 114. As shown in FIGS. 3 and 4, the clutch assemblies 140A, 140B may be substantially aligned with each other and may both be accommodated in the clutch housing 136.

In a number of variations the electric drive unit 130 may include a hollow intermediate shaft 160 that may be operatively supported within the hollow output shaft 152 of the electric machine 134. As shown in FIG. 3, the hollow intermediate shaft 160 may be operatively attached to the clutch housing 136 and may be disposed in torque translating relationship between the clutch housing 136 and the electric machine 134. In a number of variations the hollow intermediate shaft 160 may be disposed in torque translating relationship between the clutch housing 136 and a gear set, generally indicated at 162 and discussed in greater detail below. In a number of variations one of the driven shafts 138A, 138B may be operatively supported within the hollow intermediate shaft 160. In a number of variations the driven shaft 138B may extend through the intermediate shaft 160, and the intermediate shaft 160 may extend through the hollow output shaft 152 of the electric machine 134. This configuration may improve the overall packaging size and space efficiency of the electric drive unit 130. In a number of variations the electric machine 134 and/or shafts 138A, 138B, 152, 160 may be aligned, spaced, or configured differently.

In a number of variations the electric drive unit 130 may include the gear set 162 which may adjust the rotational speed and/or torque generated by the electric machine 134. The gear set 162 may be disposed in torque translating relationship between the electric machine 134 and the clutch housing 136. Thus, rotational torque generated by the electric machine 134 may be translated to the gear set 162 which, in turn, may translate rotational torque to the hollow intermediate shaft 160 which, in turn, may translate rotational torque to the clutch housing 136. In a number of variations the electric drive unit 130 may be configured differently, with or without the use of the gear set 162. In a number of variations the gear set 162 may include a multispeed transmission, generally indicated at 164, which may be in rotational communication with the clutch housing 136 for selectively varying rotational speed and/or torque at a plurality of predetermined gear ratios. In a number of variations the multispeed transmission 164 may be a two-speed transmission that may be selectively moved between two gear ratios, such as high range and low range. The multispeed transmission 164 may include an engagement coupling, generally indicated at 166, that may effect changing between gear ratios. In a number of variations the engagement coupling 166 may be realized as a synchronizer or a dog clutch (not shown in detail, but generally known in the art) that may be actuated by a hydraulic actuator 168. In a number of variations as illustrated in FIGS. 3 and 4, the hydraulic actuator may be at least partially disposed within the main housing 132 of the electric drive unit 130, or may be operatively attached or otherwise secured to any part of the electric drive unit 130. The hydraulic actuator 168 may be in selective fluid communication with the pump assembly 142 (shown in FIGS. 5 and 6), and may be selectively moveable between a first position wherein the multispeed transmission 164 may adjust rotational torque at a first predetermined ratio (see FIG. 3), and a second position wherein the multispeed transmission 164 may adjust rotational torque at a second predetermined ratio (see FIG. 4). In a number of variations the hydraulic control system 141 may include a shift valve 169 in fluid communication between the pump assembly 142 and the hydraulic actuator 168 (see FIGS. 5 and 6). As shown in FIGS. 3 and 4, the hydraulic actuator 168 may have first and second actuator ports 168A, 168B that may be defined in the main housing 132 adjacent to the hydraulic actuator 168. The actuator ports 168A, 168B may be in fluid communication with the shift valve 169. The controller 150 may be used to drive the shift valve 169 so as to direct hydraulic fluid toward the actuator ports 168A, 168B so to move the hydraulic actuator 168 between the first and second positions (compare FIGS. 3 and 4). In a number of variations the multispeed transmission 164 and/or hydraulic actuator 168 may be configured, controlled, or actuated in any suitable way, or may be omitted entirely.

In a number of variations, the gear set 162 may include at least one planetary gear reduction, generally indicated at 170, that may be disposed in torque translating relationship between the electric machine 134 and the multispeed transmission 164. The planetary gear reduction 170 may be used to multiply rotational speed (which may be in reduction), and/or torque (which may be increased), generated by the electric machine at a fixed predetermined ratio. The ratios of the planetary gear reduction 170 and the multispeed transmission 164 may be adjusted depending on the application of the powertrain system 110, whereby different ratios may be implemented for vehicles with different requirements in terms of weight, top speed, acceleration, and the like. In a number of variations a "stacked" arrangement of two planetary gear assemblies 170A, 170B may cooperate so as to define the planetary gear reduction 170. In a number of variations the planetary gear reduction 170 may be realized by a single planetary gear assembly, or by more than two planetary gear assemblies, arranged in any suitable way.

With reference to FIG. 4, in a number of variations the planetary gear assembly 170A may include a sun gear 171 that may be formed as part of, or connected with the output shaft 152. The sun gear 171 may mesh with a number of planet gears 173. The planet gear or gears 173 may mesh with a ring gear 175 that may be fixed or held and may be engaged with the main housing 132. Rotation of the sun gear 171 may cause the planet gear or gears 173 to rotate and to walk around the inside of the ring gear 175 causing the planet carrier 177 to rotate. The planet carrier may include, or may be connected with a torque transfer element 179, that may rotate with the carrier 177 and that may extend toward the engagement coupling 166. In high range, the torque transfer element 179 may be connected to the intermediate shaft 160 through the engagement coupling 166 to drive the clutch housing 136 from the electric machine 134 as shown in FIG. 3. In a neutral state the engagement coupling may decouple the electric machine 134 from the clutch housing 136 (as one skilled in the art will realize is as shown in the engagement coupling of FIG. 1).

In a number of variations the planetary gear assembly 170B may be positioned around the torque transfer element 179 and may include a sun gear 181 that may be formed with, or connected to the torque transfer element 179. The sun gear 181 may mesh with a number of planet gears 183. The planet gear or gears 183 may mesh with a ring gear 185 that may be fixed or held and may be engaged with the main housing 132, and that may be a common ring gear with the ring gear 175. Rotation of the sun gear 181 may cause the planet gear or gears to 183 rotate and to walk around the inside of the ring gear 185 causing the planet carrier 187 to rotate. The planet carrier 187 may include, or may be connected with a torque transfer element 189, that may rotate with the carrier 187 and that may extend toward the engagement coupling 166. The torque transfer element 189 may engage a torque transfer element 199 that may freely rotate around the intermediate shaft 160 in neutral and high range. In low range, the torque transfer element 199 may be connected to the intermediate shaft 160 through the engagement coupling 166 to drive the clutch housing 136 from the electric machine 134 as shown in FIG. 4.

Referring now to FIGS. 2-6, the hydraulic clutch assemblies 140A, 140B may be actuated by the hydraulic control system 141. Each of the clutch assemblies 140A, 140B may have a hydraulic clutch inlet 172A, 172B, and may have a plurality of stacked plates 174 and interleaved clutch discs 176. In a number of variations by independently controlling pressure and/or flow of hydraulic fluid to the clutch assemblies 140A, 140B via the control valves 144A, 144B, smooth transitions between full engagement and disengagement of the respective driven shafts 138A, 138B and the clutch housing 136 may be ensured. The amount of slip in each respective clutch assembly 140A, 140B may be independently controlled with the controller 150. In a number of variations the hydraulic control system 141 of the electric drive unit 130 may be configured so as to provide torque vectoring functionality to each of the second pair of road wheels 118. In a number of variations the clutch assemblies 140A, 140B may be configured, actuated, modulated, or otherwise controlled differently, with or without the use of plates 174 and/or discs 176 discussed above.

In a number of variations the plates 174 and clutch discs 176 of the clutch assemblies 140A, 140B may cooperate so as to translate rotational torque between the clutch housing 136 and the respective driven shaft 138A, 138B in response to predetermined changes in hydraulic fluid pressure and/or flow, as may be supplied to the clutch inlets 172A, 172B via the pump assembly 142 of the hydraulic control system 141. The plates 174 may be fixed to rotate with their respective driven shaft 138A, 138B, and may be axially slidable thereon. The discs 176 may be axially slidable and may be fixed to rotate with the clutch housing 136 which may be driven by the electric machine 134 through the multi-speed transmission 164 including the gear set 162 and the intermediate shaft 160. The clutch housing 136 may include an annular separator 167 against which the clutch plates 174 and discs 176 of each clutch assembly 140A, 140B may be compressed to frictionally engage and transfer rotation. In a number of variations the pump assembly 142 may have a pump outlet 178 and may act to provide a source of pressurized hydraulic fluid to the clutch inlets 172A, 172B via the control valves 144A, 144B. The control valves 144A, 144B may each include a valve inlet 180A, 180B and a valve outlet 182A, 182B. The valve inlets 180A, 180B may each be in fluid communication with the pump outlet 178, and the valve outlets 182A, 182B may each be in respective fluid communication with one of the clutch inlets 172A, 172B of the clutch assemblies 140A, 140B (see FIGS. 5 and 6). The control valves 144A, 144B may each be selectively movable between a closed position and an open position. In the closed position, pressurized fluid from the pump assembly 142 may be prevented from flowing through the valve 144A, 144B toward the respective clutch assembly 140A, 140B. In the open position, pressurized fluid from the pump assembly 142 may flow through the valve 144A, 144B toward the respective clutch assembly 140A, 140B such that rotational torque generated by the electric machine 134 may be selectively and independently translated to each of the road wheels 118 of the second driveline 114 of the powertrain system 110.

In a number of variations the control valves 144A, 144B of the hydraulic control system 141 may be realized as solenoid valves driven by the controller 150, which may be configured to modulate the clutch assemblies 140A, 140B by regulating hydraulic pressure and/or flow to the clutch inlets 172A, 172B, as discussed above. It will be appreciated that there are many different types of solenoid valves known in the art and, thus, the control valves 144A, 144B may be of any suitable type, actuated in any suitable way. In a number of variations the control valves 144A, 144B may be cycled, such as by pulse width modulation (PWM), or may include variable position functionality, actuated such as with a stepper motor or an additional solenoid (not shown, but generally known in the art).

Figure 5:
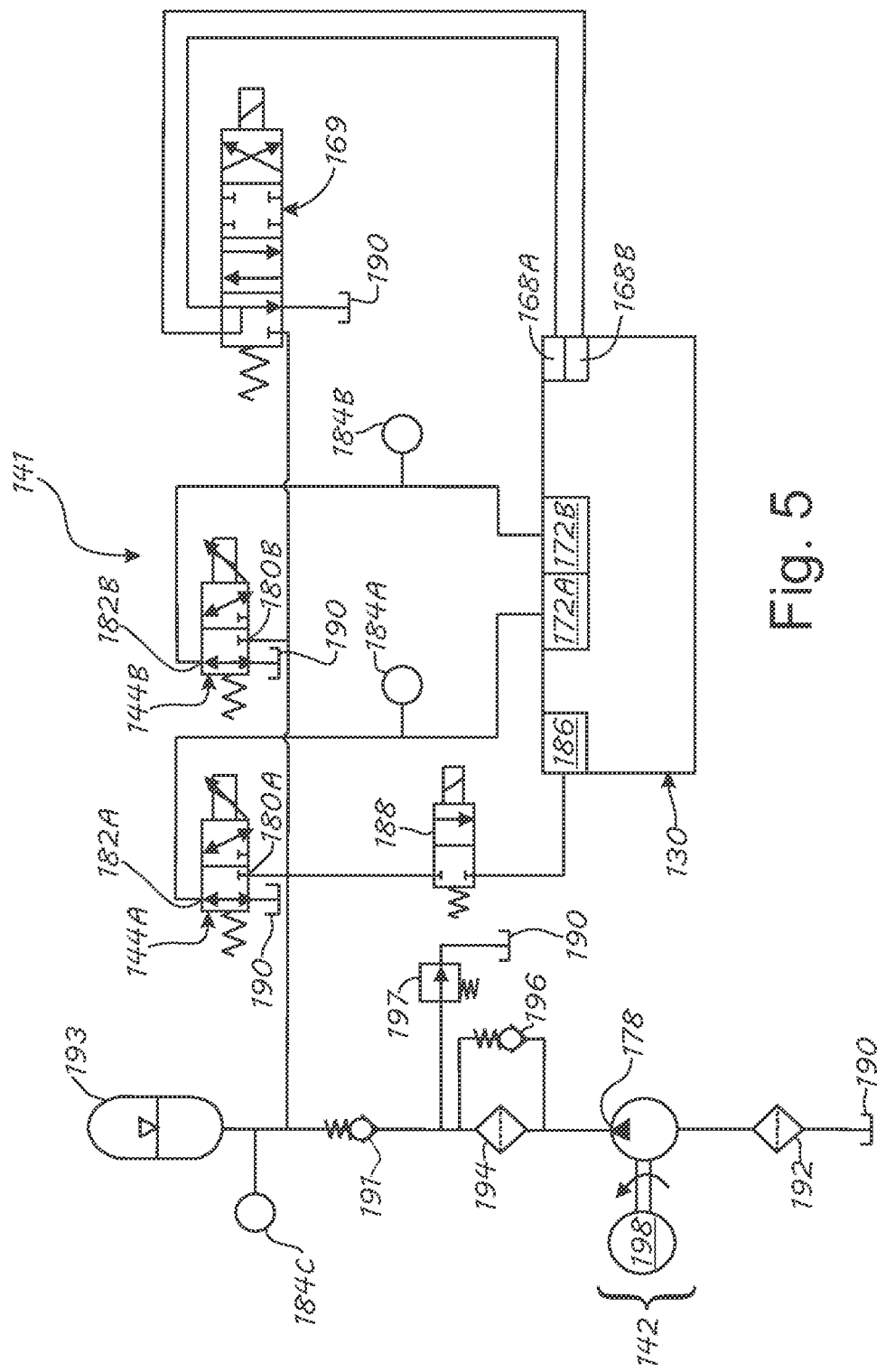
FIG. 5 is a schematic view of a hydraulic control system of the electric drive unit of FIGS. 3 and 4, according to a number of variations.
Figure 6:
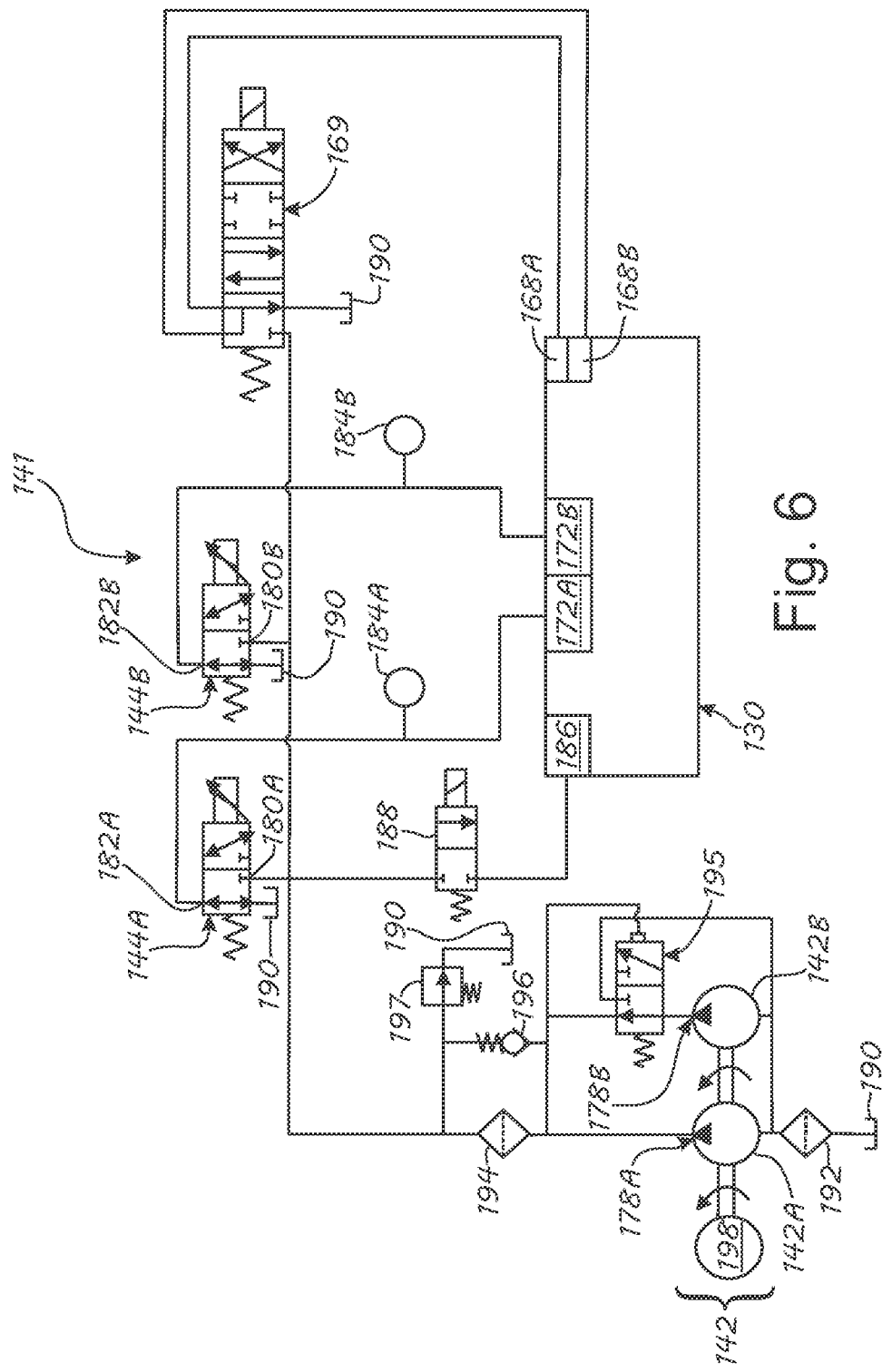
FIG. 6 is a schematic view of the hydraulic control system of the electric drive unit of FIGS. 3 and 4, according to a number of variations.

Referring to FIGS. 5 and 6, the hydraulic control system 141 of the electronic control unit 130 is depicted schematically according to a number of variations. In one embodiment, the hydraulic control system 141 may include a pair of sensors 184A, 184B. One of the sensors 184A may be disposed between one of the control valves 144A and one of the clutch assemblies 140A, and the other of the sensors 184B may be disposed between the other of the control valves 144B and the other of the clutch assemblies 140B. The sensors 184A, 184B may be in fluid communication with respective clutch inlets 172A, 172B of the clutch assemblies 140A, 140B. The sensors 184A, 184B may each generate a signal that may represent at least one of hydraulic pressure, temperature, viscosity, and/or flowrate. The sensors 184A, 184B may each be in electrical communication with the controller 150 (electrical connection not shown in detail, but generally known in the art). The controller 150 may be configured to monitor the sensors 184A, 184B and may adjust modulation of the respective clutch assemblies 140A, 140B via the control valves 144A, 144B in response to predetermined changes in signals generated by the sensors 184A, 184B so as to selectively translate rotational torque generated by the electric machine 134 to each of the road wheels 118 of the second driveline 114 of the powertrain system 110. In a number of variations at least one of the sensors 184A, 184B may be a pressure transducer for generating a signal representing the hydraulic fluid pressure between the respective control valve 144A, 144B and the corresponding clutch assembly 140A, 140B of the electric drive unit 130.

Heat maybe generated during modulation of the clutch assemblies 140A, 140B, as friction may occur between the plates 174, clutch discs 176, and clutch housing 136 in operation. In addition to being actuated with hydraulic fluid, the clutch assemblies 140A, 140B may be lubricated with hydraulic fluid to help ensure long life and consistent performance of the electric drive unit 130. In a number of variations the hydraulic control system 141 of the electric drive unit 130 may include a lubrication port 186 defined by the main housing 132 adjacent to and in fluid communication with the clutch housing 136, and a lubrication valve 188 may be disposed in fluid communication between the pump outlet 178 and the lubrication port 186. The lubrication valve 188 may be in electrical communication with and may be selectively driven as required by the controller 150 (electrical connection not shown in detail, but generally known in the art) so as to direct hydraulic fluid to the clutch housing 136 for lubricating the clutch assemblies 140A, 140B. In a number of variations illustrated in FIGS. 3 and 4, the lubrication port 186 may direct hydraulic fluid to the driven shaft 138A which, may in turn, direct hydraulic fluid to the clutch housing 136. In a number of variations the lubrication port 186 may be disposed in any suitable location.

In a number of variations the pump assembly 142 may act to provide a source of pressurized hydraulic fluid to various components of the hydraulic control system 141 of the electric drive unit 130. The hydraulic control system 141 may have a reservoir 190 in fluid communication with the pump assembly 142 for storing non-pressurized hydraulic fluid (see FIGS. 5 and 6). The reservoir 190 may also be in fluid communication with the control valves 144A, 144B, shift valve 169, and/or the lubrication valve 188 for accommodating residual fluid during actuation. In one embodiment, a suction filter 192 may be disposed in fluid communication between the pump assembly 142 and the reservoir 190. The suction filter 192 may protect the pump assembly 142 from particulates and other contamination that may accumulate in the hydraulic fluid. A pressure filter 194, may be disposed in fluid communication between the pump outlet 178 and the control valves 144A, 144B, the shift valve 169, and the lubrication valve 188, and may provide additional filtering protection from contamination, such as particulates accumulated in the hydraulic fluid.

In a number of variations a filter check valve 196 may be disposed in parallel with the pressure filter 194. The filter check valve 196 may allow fluid to effectively bypass the pressure filter 194 under certain operating conditions, such as where the pressure filter 194 may become clogged and may otherwise restrict flow of hydraulic fluid to the control valves 144A, 144B, the shift valve 169, and the lubrication valve 188. In a number of variations the hydraulic control system 141 may include a pressure release valve 197 that may be disposed in fluid communication between the pressure filter 194 and the control valves 144A, 144B, the shift valve 169, and the lubrication valve 188. The pressure release valve 197 may be used to bleed hydraulic pressure so as to prevent an over-pressure condition.

In operation the hydraulic fluid in the hydraulic control system 141 of the electric drive unit 130 may heat up and changes in the temperature of the hydraulic fluid may result in a corresponding change in the viscosity of the hydraulic fluid. As such, where a specific hydraulic pressure may be needed to actuate the control valves 144A, 144B so as to modulate the clutch assemblies 140A, 140B to properly operate the hydraulic control system 141 of the electric drive unit 130, the volume of hydraulic fluid required to achieve the requisite hydraulic pressure may vary with operating temperature. Ensuring responsiveness and operation of the clutch assemblies 140A, 140B of the electric drive unit 130 may require the pump assembly 142 of the hydraulic control system 141 to properly provide pressurized hydraulic fluid under a number of different operating conditions. In a number of variations the pump assembly 142 may include at least one electric pump motor, schematically illustrated at 198 in FIGS. 5 and 6. The electric pump motor 198 may be powered by the battery 148 and may be driven by the controller 150 so as to properly regulate the hydraulic fluid pressure. In a number of variations a check valve 191 may be used to prevent back-flow of fluid toward the pump outlet 178.

In a number of variations illustrated in FIG. 5, the hydraulic control system 141 may include an accumulator 193 in selective fluid communication with the pump assembly 42 for storing pressurized hydraulic fluid. More specifically, the accumulator 193 may be disposed in fluid communication between the pump outlet 178 of the pump assembly 142 and the control valves 144A, 144B, the shift valve 169, and the lubrication valve 188. The accumulator 193 may be a conventional gas-charged hydraulic accumulator, but those having ordinary skill in the art will appreciate that the accumulator 193 may be of any suitable type without departing from the scope of the present invention. In a number of variations an additional sensor 184C may be disposed in fluid communication with the accumulator 193, may be in electrical communication with the controller 150 (electrical connection not shown in detail, but generally known in the art), and may be used to help the controller 150 detect and address an over-pressure condition such as by adjusting the rotational speed of the electric pump motor 198.

In a number of variations illustrated in FIG. 6, the hydraulic control system 141 may include a pressure control valve 195 that may be disposed in fluid communication with the pump assembly 142. The pressure control valve 195 may be used to selectively modulate hydraulic pressure to the clutch assemblies 140A, 140B. The pressure control valve 195 may be in electrical communication with and driven by the controller 150 (electrical connection not shown in detail, but generally known in the art). In a number of variations the pump assembly 142 may include a first pump 142A that may have a first flowrate, and a second pump 142B that may have a second flowrate. In a number of variations the second flowrate may be greater than the first flowrate. The first pump 142A may be in rotational communication with the second pump 142B, and both pumps 142A, 142B may be driven by the electric pump motor 198. The pumps 142A, 142B may each have respective pump outlets 178A, 178B, and the pressure control valve 195 may be disposed between the pump outlets 178A, 178B so that the controller 150 may be used to modulate or otherwise control the pressure control valve 195 as required, such as to compensate for a change in system pressure that may be detected using the signal generated by one or more of the sensors 184A, 184B, 184C.

The electric drive unit 43 or 130 may significantly improve the performance of vehicle powertrain systems 110 and may enable simple and space-efficient implementation of battery-powered electric auxiliary propulsion systems 122 into vehicles. Specifically, it will be appreciated that the electric drive unit 43 or 130 may allow vehicles to benefit from advantages traditionally reserved for hybrid or electric vehicles, such as regenerative breaking and/or torque vectoring. Thus, an otherwise conventional front-wheel-drive vehicle with an internal combustion engine 124 may be outfitted with the electric drive unit 43 or 130 in a simple and cost effect manner while, at the same time, providing significant improvements in fuel economy/range, acceleration, and cornering stability. Further, the electric drive unit 43 or 130 may reduce the cost and complexity of manufacturing vehicles that have superior operational characteristics, such as high efficiency, reduced weight, and improved emissions, component packaging, component life, and vehicle drivability.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product that may comprise an electric machine, and may include first and second shafts connectable to the electric machine in torque a transferring relationship. A first clutch assembly may selectively connect the electric machine with the first shaft and a second clutch assembly may selectively connect the electric machine with the second shaft. A gear set may be operatively engageable between the electric machine and the first and second clutch assemblies. An engagement coupling may connect the gear set in a high range between the electric machine and the first and second clutch assemblies, and the engagement coupling may connect the gear set in a low range between electric machine and the first and second clutch assemblies.

Variation 2 may include the product according to variation 1 wherein the gear set may comprise a sun gear, and a planet gear that may mesh with the sun gear. The planet gear may be supported for rotation on a carrier that may be engageable with the engagement coupling.

Variation 3 may include the product according to variation 1 or 2 and may include a separator that may be connectable with the electric machine and may separate the first clutch assembly from the second clutch assembly. The first clutch assembly may include a first set of discs and a first set of plates that may be fixed to rotate with the first shaft. A first actuator may compress the first set of discs and the first set of plates against the separator to transfer rotation between the electric machine and the first shaft. The second clutch assembly may include a second set of discs and a second set of plates that may be fixed to rotate with the second shaft. A second actuator may compress the second set of discs and the second set of plates against the separator to transfer rotation between the electric machine and the second shaft.

Variation 4 may include the product according to variation 3 and may include a clutch housing wherein the separator may comprise a part of the clutch housing, and wherein the clutch housing may be selectively driven by the electric machine.

Variation 5 may include the product according to any of variations 1 through 4 and may include a first road wheel that may be connected to the first shaft. A second road wheel may be connected to the second shaft. The first road wheel may be supplied with a first torque through the first clutch assembly. The second road wheel may be supplied with a second torque through the second clutch assembly. The first and second torques may be independently varied by varying a pressured fluid that may act on the first and second clutch assemblies through a hydraulic circuit.

Variation 6 may include the product according to variation 5 wherein each of the clutch assemblies may have a hydraulic clutch inlet. The hydraulic circuit may comprise a pump assembly that may act to provide the pressurized fluid. The pump assembly may have a pump outlet. A pair of control valves may each include a valve inlet that may be in fluid communication with the pump outlet and a valve outlet that may be in respective fluid communication with one of the clutch assemblies. Each of the control valves may have a closed position wherein the pressurized fluid from the pump assembly may be prevented from flowing through the valve, and an open position wherein the pressurized fluid from the pump assembly may flow through the valve to selectively and independently translate the first and second torques to each of the first and second road wheels.

Variation 7 may include the product according to variation 5 wherein the electric machine may be coaxially aligned with the first and second clutch assemblies.

Variation 8 may include an electric drive unit and may include an electric machine that may acts to generate a rotational torque. A first shaft may be responsive to the rotational torque, and a second shaft may also be responsive to the rotational torque. A clutch housing may be in rotational communication with the electric machine. A first clutch assembly may include a first set of clutch discs rotatably fixed to the clutch housing. A second clutch assembly may include a second set of clutch discs rotatably fixed to the clutch housing. A first set of clutch plates may be provided in the first clutch assembly and may be rotatably fixed to the first shaft and may be interleaved with the first set of clutch discs. A second set of clutch plates may be provided in the second clutch assembly and may be rotatably fixed to the second shaft and may be interleaved with the second set of clutch discs. A gear set may be engageable between the electric machine and each of the first and second clutch assemblies. The gear set may effect a low range, a high range and a neutral operating state between the electric machine and each of the first and second clutch assemblies.

Variation 9 may include the electric drive unit according to variation 8 and may include a pump assembly that may act to provide a source of a pressurized fluid. The pump assembly may have a pump outlet. A pair of control valves may each include a valve inlet that may be in fluid communication with the pump outlet and a valve outlet that may be in respective fluid communication with one of the clutch assemblies. Each of the control valves may have a closed position wherein the pressurized fluid from the pump assembly may be prevented from flowing through the valve, and an open position wherein the pressurized fluid from the pump assembly may flow through the valve so as to selectively and independently translate rotational torque generated by the electric machine to each of the shafts through the clutch assemblies.

Variation 10 may include the electric drive unit according to variation 9 and may include at least one pair of sensors where one of the sensors may be disposed between one of the control valves and one of the clutch assemblies, and the other of the sensors may be disposed between the other of the control valves and the other of the clutch assemblies. The sensors may each generate a signal representing at least one of hydraulic fluid pressure, temperature, viscosity, or flow-rate.

Variation 11 may include the electric drive unit according to variation 10 and may include a controller wherein the controller may modulate the control valves in response to predetermined changes in the signals generated by the sensors to selectively translate rotational torque generated by the electric machine to each of the shafts.

Variation 12 may include an electric drive unit for use in a powertrain system and may include first and second drivelines, and a primary propulsion system translating rotational torque only to the first driveline. The second driveline may include first and second road wheels. The electric drive unit may comprising an electric machine that may generate a rotational torque. A clutch housing may be in rotational communication with the electric machine. A first shaft may be rotatably fixed with the first road wheel. A second shaft may be rotatably fixed with the second wheel. A first clutch assembly may selectively couple the clutch housing with the first shaft such that the rotational torque may be selectively and independently modulated through the first clutch assembly to the first road wheel. A second clutch assembly may selectively couple the clutch housing with the second shaft such that the rotational torque may be selectively and independently modulated through the second clutch assembly to the second road wheel.

Variation 13 may include the electric drive unit according to variation 12 and may include a gear set that may be disposed in torque translating relationship between the electric machine and the clutch housing and may effect a change in rotational speed between the electric machine and the clutch housing.

Variation 14 may include the electric drive unit according to variation 13 wherein the change in rotational speed may comprise a high range, a low range wherein the change in rotational speed may be greater than in the high range, and a neutral state wherein the electric machine may be decoupled from the clutch housing.

Variation 15 may include the electric drive unit according to variation 13 or 15, wherein the gear set may include at least one planetary gear reduction.

Variation 16 may include the electric drive unit according to any of variations 12 through 15, wherein the electric machine may include a hollow output shaft that may be axially aligned with at least one of the first or second shafts.

Variation 17 may include the electric drive unit according to variation 16, and may include a hollow intermediate shaft that may be operatively supported within the hollow output shaft and may be disposed in torque translating relationship between the electric machine and the clutch housing.

Variation 18 may include the electric drive unit according to variation 17 wherein one of the first or second shafts may be operatively supported within the hollow intermediate shaft.

Variation 19 may include the electric drive unit according to any of variations 12 through 18, wherein each of the first and second shafts may extend at least partially into the clutch housing.

Variation 20 may include the electric drive unit according to any of variations 12 through 19 and may include a first gear fixed to rotate with the electric machine, a second gear meshing with the first gear, a gear set disposed in torque translating relationship between the electric machine and the clutch housing, and the gear set driven by the second gear.

What is claimed is:

1. A product comprising an electric machine, a first shaft connectable to the electric machine and a second shaft connectable to the electric machine, each in a torque transferring relationship, a first clutch assembly selectively connecting the electric machine with the first shaft and a second clutch assembly selectively connecting the electric machine with the second shaft, a gear set operatively engageable between the electric machine and the first and second clutch assemblies, and an engagement coupling connecting the gear set in a high range between the electric machine and the first and second clutch assemblies, the engagement coupling connecting the gear set in a low range between the electric machine and the first and second clutch assemblies, and a separator connectable with the electric machine and separating the first clutch assembly from the second clutch assembly, wherein the first clutch assembly includes a first set of discs, and a first set of plates fixed to rotate with the first shaft, and comprising a first actuator compressing the first set of discs and the first set of plates against the separator to transfer rotation between the electric machine and the first shaft, wherein the second clutch assembly includes a second set of discs, and a second set of plates fixed to rotate with the second shaft, and comprising a second actuator compressing the second set of discs and the second set of plates against the separator to transfer rotation between the electric machine and the second shaft.

2. The product according to claim 1 wherein the gear set comprises a sun gear, and a planet gear meshing with the sun gear, the planet gear supported for rotation on a carrier that is engageable with the engagement coupling.

3. The product according to claim 1 further comprising a clutch housing wherein the separator comprises a part of the clutch housing, and wherein the clutch housing is selectively driven by the electric machine.

4. The product according to claim 1 further comprising a hydraulic circuit, and a first road wheel connected to the first shaft, and a second road wheel connected to the second shaft, wherein the first road wheel is supplied with a first torque through the first clutch assembly and the second road wheel is supplied with a second torque through the second clutch assembly, and wherein the first and second torques are independently varied by varying a pressured fluid acting on the first and second clutch assemblies through the hydraulic circuit.

5. The product according to claim 4 wherein each of the clutch assemblies has a hydraulic clutch inlet and the hydraulic circuit comprises a pump assembly that acts to provide the pressurized fluid, the pump assembly having a pump outlet, and a pair of control valves each including a valve inlet in fluid communication with the pump outlet and a valve outlet in respective fluid communication with one of the clutch assemblies, each of the control valves has a closed position wherein the pressurized fluid from the pump assembly is prevented from flowing through the valve, and an open position wherein the pressurized fluid from the pump assembly flows through the valve to selectively and independently translate the first and second torques to each of the first and second road wheels.

6. The product according to claim 4 wherein the electric machine is coaxially aligned with the first and second clutch assemblies.

7. An electric drive unit comprising an electric machine that acts to generate a rotational torque, a first shaft responsive to the rotational torque, a second shaft responsive to the rotational torque, a clutch housing in rotational communication with the electric machine, a first clutch assembly with a first set of clutch discs rotatably fixed to the clutch housing, a second clutch assembly with a second set of clutch discs rotatably fixed to the clutch housing, a first set of clutch plates in the first clutch assembly rotatably fixed to the first shaft and interleaved with the first set of clutch discs, a second set of clutch plates in the second clutch assembly rotatably fixed to the second shaft and interleaved with the second set of clutch discs, and a gear set engageable between the electric machine and each of the first and second clutch assemblies, the gear set effecting a low range, a high range and a neutral operating state between the electric machine and each of the first and second clutch assemblies.

8. The electric drive unit according to claim 7, further comprising a pump assembly that acts to provide a source of a pressurized fluid, the pump assembly having a pump outlet, and a pair of control valves each including a valve inlet in fluid communication with the pump outlet and a valve outlet in respective fluid communication with one of the clutch assemblies, each of the control valves having a closed position wherein the pressurized fluid from the pump assembly is prevented from flowing through the valve, and an open position wherein the pressurized fluid from the pump assembly can flow through the valve so as to selectively and independently translate rotational torque generated by the electric machine to each of the shafts through the clutch assemblies.

9. The electric drive unit according to claim 8, further comprising at least one pair of sensors with one of the sensors disposed between one of the control valves and one of the clutch assemblies, and the other of the sensors disposed between the other of the control valves and the other of the clutch assemblies, the sensors each generating a signal representing at least one of hydraulic fluid pressure, temperature, viscosity, or flowrate.

10. The electric drive unit according to claim 9 further comprising a controller wherein the controller modulates the control valves in response to predetermined changes in the signals generated by the sensors to selectively translate rotational torque generated by the electric machine to each of the shafts.

11. An electric drive unit for use in a powertrain system including first and second drivelines, and a primary propulsion system translating rotational torque only to the first driveline, the second driveline including first and second road wheels, the electric drive unit comprising an electric machine generating a rotational torque, a clutch housing in rotational communication with the electric machine, a first shaft rotatably fixed with the first road wheel, a second shaft rotatably fixed with the second wheel, a first clutch assembly selectively coupling the clutch housing with the first shaft such that the rotational torque can be selectively and independently modulated through the first clutch assembly to the first road wheel, and a second clutch assembly selectively coupling the clutch housing with the second shaft such that the rotational torque can be selectively and independently modulated through the second clutch assembly to the second road wheel.

12. The electric drive unit according to claim 11, further comprising a gear set disposed in torque translating relationship between the electric machine and the clutch housing effecting a change in rotational speed between the electric machine and the clutch housing.

13. The electric drive unit according to claim 12 wherein the change in rotational speed comprises a high range, a low range wherein the change in rotational speed is greater than in the high range, and a neutral state wherein the electric machine is decoupled from the clutch housing.

14. The electric drive unit according to claim 12, wherein the gear set includes at least one planetary gear reduction.

15. The electric drive unit according to claim 11, wherein the electric machine includes a hollow output shaft axially aligned with at least one of the first or second shafts.

16. The electric drive unit according to claim 15, further comprising a hollow intermediate shaft operatively supported within the hollow output shaft and disposed in torque translating relationship between the electric machine and the clutch housing.

17. The electric drive unit according to claim 16 wherein one of the first or second shafts is operatively supported within the hollow intermediate shaft.

18. The electric drive unit according to claim 11, wherein each of the first and second shafts extends at least partially into the clutch housing.

19. The electric drive unit according to claim 11 further comprising a first gear fixed to rotate with the electric machine, a second gear meshing with the first gear, a gear set disposed in torque translating relationship between the electric machine and the clutch housing, and the gear set driven by the second gear.

* * * * *